Patented Apr. 25, 1944

2,347,573

UNITED STATES PATENT OFFICE 2,347,573

BENZALMALONONITRILE AS A PEST-CONTROL AGENT

William Moore, Stamford, Conn., assignor to American Cyanamid Company, New York, N. Y., a corporation of Maine No Drawing. Application May 2, 194,
Serial No. 391,486

1 Claim. (Cl. 167—30)

The present invention relates to a pest-control agent and more particularly to a compound which is especially effective as a contact poison for the control of insects and allied pests.

I have discovered that benzalmalononitrile possesses strong insecticidal activity against soft-bodied and sucking insects which are particularly difficult to exterminate, for example the citrus red spider, *Tetranychus citri*, and the bean aphid, *Aphis rumicis*.

The following example illustrates a specific method of preparing the above compound in accordance with the invention. Materials employed are in parts by weight.

Example

To a mixture consisting of 66 parts of malononitrile and 110 parts of benzaldehyde cooled to 0° C., there was added 1 part of di-n-propylamine (catalyst). After standing one hour at a temperature of approximately 5° C., the mass started to crystallize. The reaction was complete in two hours. After recrystallization from ethyl alcohol, the benzalmalononitrile was obtained in the form of long colorless needles which melted at 87° C.

Spray solutions were prepared by dissolving the benzalmalononitrile in a solvent medium consisting of 65% acetone and 35% water. A 97.6% control was obtained when a spray of 1–1000 dilution was used against the citrus red spider, *Tetranychus citri*. At a dilution of 1–500 the insecticide gave a 72.4% control on the bean aphid, *Aphis rumicis*.

Although the compound of this invention is especially effective as a contact poison for the control of insect pests, it may also be used for fungicidal and bactericidal purposes.

This new insecticide may be applied in any of the conventional manners. Thus, for example, it may be used in an aqueous emulsion or incorporated in organic liquids such as the aliphatic and aromatic hydrocarbons for spraying purposes, or it may be effectively used in dusts with such inert diluents as kieselguhr, wood flour, walnut shell, talc, and the like.

While the invention has been described with particular reference to specific embodiments, it is to be understood that it is not to be limited thereto but is to be construed broadly and restricted solely by the scope of the appended claim.

I claim:

A method of combatting insects which comprises contacting them with a composition containing as an active ingredient benzalmalononitrile.

WILLIAM MOORE.